(12) United States Patent
Oelert

(10) Patent No.: US 12,380,753 B2
(45) Date of Patent: Aug. 5, 2025

(54) VALIDATOR DEVICE FOR A PASSENGER TRANSPORT SYSTEM

(71) Applicant: Scheidt & Bachmann GmbH, Mönchengladbach (DE)

(72) Inventor: Kai Oelert, Walldorf (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 54 days.

(21) Appl. No.: 18/359,553

(22) Filed: Jul. 26, 2023

(65) Prior Publication Data

US 2024/0054835 A1    Feb. 15, 2024

(30) Foreign Application Priority Data

Aug. 15, 2022 (DE) ..................... 10 2022 120 499.5

(51) Int. Cl.
*G07C 9/20* (2020.01)
*G01C 21/34* (2006.01)

(52) U.S. Cl.
CPC ........... *G07C 9/20* (2020.01); *G01C 21/3423* (2013.01)

(58) Field of Classification Search
None
See application file for complete search history.

(56) References Cited

U.S. PATENT DOCUMENTS

| | | | |
|---|---|---|---|
| 9,727,865 B2 * | 8/2017 | Judge | G06Q 20/4093 |
| 2008/0033880 A1 * | 2/2008 | Fiebiger | G06Q 20/20 |
| | | | 235/382 |
| 2008/0156873 A1 | 7/2008 | Wilhelm et al. | |
| 2009/0171682 A1 * | 7/2009 | Dixon | G06Q 20/3278 |
| | | | 235/492 |

FOREIGN PATENT DOCUMENTS

| | | |
|---|---|---|
| DE | 10 2012 101 638 A1 | 8/2013 |
| DE | 2020 116 943 A1 | 12/2021 |
| WO | 00/31691 A1 | 6/2000 |

OTHER PUBLICATIONS

European Patent Office, Search Report, Application No. 23188890.0, dated Feb. 2, 2024, 14 pages (in German).
German Patent Office, Office Action, Application No. 10 2022 120 499.5, dated Jun. 12, 2023; 14 pages (in German).

* cited by examiner

*Primary Examiner* — John F Mortell
(74) *Attorney, Agent, or Firm* — Sunstein LLP

(57) ABSTRACT

A validator device for a passenger transportation system includes a reader module configured to detect an electronic medium identifier of an open payment ticket medium. Data memory of the validator device stores a denial data set containing at least one denied electronic medium identifier and at least one denial attribute assigned to the denied electronic medium identifier. A comparator module identifies a denied electronic medium identifier from the at least one denied electronic medium identifier contained in the denial data set by comparing the detected electronic medium identifier with the at least one denied electronic medium identifier. A verification module checks, upon identification of a denied electronic medium identifier, whether the at least one denial attribute assigned to the identified denied electronic medium identifier satisfies predetermined denial criterion. An output module is configured to permit a use of the passenger transportation system responsive to a determination by the verification module.

16 Claims, 4 Drawing Sheets

VALIDATOR DEVICE FOR A PASSENGER TRANSPORT SYSTEM

CROSS-REFERENCE TO RELATED APPLICATIONS

This application claims the benefit of German patent application No. 10 2022 120 499.5, filed Aug. 15, 2022, the disclosures of which are incorporated herein by reference in their entirety.

TECHNICAL FIELD

The application relates to a validator device for a passenger transport system, the validator device comprising at least one reader module configured to detect an electronic medium identifier of an open payment ticket medium. In addition, the application relates to a passenger transport system and a method that can be executed in particular by a validator device.

BACKGROUND ART

A passenger transport system, in particular a public passenger transport system, serves to transport persons and users, respectively, by means of passenger transport vehicles (hereinafter referred to as transport vehicles). Exemplary and non-exhaustive transport vehicles are rail vehicles (e.g., train, subway, streetcar etc.), motor vehicles (e.g., bus), but also water vehicles and airplanes. A trip of a user with a transport vehicle from a trip start point to a trip end point is referred to herein in particular as a transport trip.

As a rule, a ticket medium is required for an authorized respectively permissible use of a transport trip respectively a corresponding transport service. The ticket medium can generally indicate that the user is authorized to perform the transport trip. In prior art passenger transport systems, for example, paper tickets can be used as ticket media, which must be purchased at a ticket vending machine or the like prior to the start of the trip.

It is also known that technically readable data is stored in ticket media, which comprise specifications about the validity of the respective ticket medium for the performing of a transport trip. In principle, passenger transport systems are also known from the state of the art that use proprietary ticket media (also referred to as closed loop ticket systems and closed payment ticket systems, respectively) and/or open payment ticket media (corresponding ticket systems are also referred to as open loop ticket systems and open payment ticket systems, respectively). Hybrid passenger transportation systems, in which both types of ticket media can be used, are also known.

The advantage of passenger transport systems with an open architecture respectively open payment ticket media over passenger transport systems with a closed architecture respectively (exclusively) proprietary ticket media is, in particular, that they are more flexible in comparison.

When using a transport vehicle for a transport trip, users and passengers, respectively, can use different open payment ticket media, in particular as user identification elements, such as tokens, chip cards (and smart cards, respectively), credit cards, bank cards (or the like), cell phones, personal digital assistants (PDAs), tablet PCs, integrated circuit chips, electronic passports, electronic identification documents, etc. In particular, an electronic medium identifier that is stored in the open payment ticket medium and can be read (only technically) can be used for authentication of the user and, for example, for subsequent billing of the performed transport trip.

It shall be understood that the operator of a passenger transportation system can specify which ticket media may actually be used and which are excluded.

A passenger transportation system with an open architecture respectively with open payment ticket media usually comprises a plurality of validator devices. A validator device (also referred to as validator for short) can be arranged in particular in a stop area (e.g., stop, station, etc.) and/or in a transport vehicle of the passenger transport system.

In particular, a validator device is configured to validate an open payment ticket medium by detecting the electronic medium identifier stored in a storage means of the open payment ticket medium. An electronic medium identifier means in particular a one-to-one electronically coded medium identifier.

For proper respectively authorized use of a transport vehicle, a user can, for example, check-in at a validator device located in the transport vehicle and/or the stop area by means of the mobile respectively portable open payment ticket medium upon entering the transport vehicle respectively a stop area (check-in can also be referred to as "log-in"). Upon leaving the transport vehicle, a user can check-out in a corresponding manner at a validator device (check-out can also be referred to as "log-out").

In order to validate the open payment ticket medium, a validator device can comprise at least one reader module, in particular in the form of a short-range interface, which is configured to read and detect, respectively, the electronic medium identifier stored in the open payment ticket medium. The detected electronic medium identifier can be used to identify the user and, in particular, to charge for the use of the transport vehicle for the distance traveled between boarding and alighting respectively the trip start point and trip end point. It is possible to identify the user with personal user data (name, address, contact details) if the user has registered accordingly, but this is not mandatory.

For each detected electronic medium identifier, a validator data set can be generated and created, respectively, by the validator device, for example as a check-in data set or as a check-out data set. A validator data set may contain at least the detected electronic medium identifier and, for example, the detection time point of the electronic medium identifier. A corresponding data set may be at least partially cryptographically encrypted. In a preferred manner, a corresponding data set may be at least partially encrypted in accordance with financial industry security guidelines. The validator data set may contain card data of credit cards or bank cards. In a preferred manner, a validator data set may be at least partially hashed.

For security reasons, a denial data set is stored in each validator device in the prior art. A validator device can have a data memory for this purpose. A prior art denial data set contains denied electronic medium identifiers, i.e., electronic medium identifiers that do not authorize for the use of a transport vehicle.

In order to detect an unauthorized electronic medium identification, a validator device of the prior art comprises a comparator module. The comparator module is configured to compare a detected electronic medium identifier with identifiers of the issuers that are permitted as electronic media in the passenger transport system anyway. From the field of contactless credit cards, for example, cards of the issuers American Express, VISA, MasterCard and VISA may be authorized, while, for example, cards of the issuer Diners Club may not be authorized; issuers of payment media that may potentially authorize the use of a transport vehicle are, for example, payment service providers such as ApplePay, GooglePay, PayPal, etc. In this context, a detected electronic medium identifier that does not originate from a permitted issuer does not authorize the use of a transport vehicle; this comparison is thus based on media types (not media individuals). The comparator module is further in particular configured to identify a denied electronic medium identifier from the at least one denied electronic medium identifier contained in the denial data set by further comparing the detected electronic medium identifier with the at least one denied electronic medium identifier. The denied electronic medium identifier identified in the further comparison thus identifies a single media individual and may thereby originate from an authorized issuer.

Furthermore, known validator devices comprise an output module that is configured to deny a use of the passenger transport system if the comparator module determines that the detected electronic medium identifier corresponds to a denied electronic medium identifier, i.e., in particular is identical. In other words, access to a transport vehicle is always denied and blocked, respectively, upon detection of a denied electronic medium identifier.

However, a disadvantage of the prior art is that the denial data set can contain an electronic medium identifier that is thus considered to be denied, but which actually authorizes the user to use a transport vehicle and the passenger transport system, respectively. The reason for this incorrect evaluation is, for example, that the inclusion reason for inclusion into the denial data set has since ceased to apply or the inclusion into the denial data set was already incorrect. However, since the corresponding electronic medium identifier is considered denied in these cases, the corresponding user is always denied the use of the transport vehicle respectively the use of a corresponding transport service, even though the user is actually authorized to use the transport vehicle with the corresponding open payment ticket medium.

Thus, in the prior art, the usability and reliability of the passenger transportation system are reduced.

It is desirable to provide a validator device for a passenger transport system which increases the usability and reliability of the passenger transport system while ensuring sufficient security at the same time.

SUMMARY OF THE INVENTION

The validator device according to the present application comprises at least one reader module. The reader module is configured to detect an electronic medium identifier of an open payment ticket medium. The validator device comprises at least one data memory. The data memory is configured to store a denial data set. The denial data set contains at least one denied electronic medium identifier and at least one denial attribute assigned to the denied electronic medium identifier. The validator device comprises at least one verification arrangement having at least one comparator module and at least one verification module. The comparator module is configured to identify a denied electronic medium identifier from the at least one denied electronic medium identifier contained in the denial data set by comparing the detected electronic medium identifier with the at least one denied electronic medium identifier. The verification module is configured to check whether the at least one denial attribute assigned to the identified denied electronic medium identifier satisfies at least one predetermined denial criterion upon identification of a denied electronic medium identifier. The validator device comprises at least one output module. The output module is configured to permit a use of the passenger transportation system if the verification module determines that the at least one denial attribute satisfies the at least one predetermined denial criterion.

In contrast to the prior art, in accordance with the application at least one denial attribute is assigned to each denied electronic medium identifier and the decision by the validator device as to whether or not a use of the passenger transport system is permitted additionally depends on the evaluation of the at least one denial attribute and at least one denial criterion, the usability and reliability of the passenger transport system is increased while at the same time sufficient security is ensured. Thus, the denial attribute can enable the passenger transport system to be used even if the associated electronic medium identifier is contained in the denial data set as a denied electronic medium identifier.

The validator device according to the application is used in a passenger transport system. A passenger transport system according to the application is in particular a public passenger transport system and serves to transport passengers and users, respectively, by means of passenger transport vehicles (hereinafter referred to as transport vehicles). Exemplary and non-exhaustive transport vehicles are rail vehicles (e.g., train, subway, streetcar etc.), motor vehicles (e.g., bus), but also water vehicles and aircrafts.

A passenger transportation system according to the application may be a check-in/check-out (CICO) system and/or a check-in/be-out (CIBO) system.

A validator device of a passenger transport system according to the application is configured to validate a ticket medium by detecting an electronic medium identifier stored in a storage means of the open payment ticket medium. In particular, in the passenger transport system according to the application, it is necessary for an authorized use of a transport vehicle that an open payment ticket medium is validated before a corresponding use, i.e., that the electronic medium identifier is detected by the validator device.

Preferably, the at least one validator device may be arranged in a stop area and/or a transport vehicle in order to enable a validating of the ticket medium upon entering the stop area and/or the transport vehicle (i.e., the space requiring payment).

A detecting of an electronic medium identifier by a validator device respectively executing of a so-called tap at a validator device upon an entering of a transport vehicle or a stop area has the particular effect of checking-in a user. In a corresponding manner, the detecting of an electronic medium identifier by a validator device respectively the executing of a tap at a validator device upon a leaving of a transport vehicle or a stop area can cause a user to check-out.

For detecting and reading, respectively, the electronic medium identifier, the validator device according to the application comprises at least one reader module. The reader module can comprise a contactless or contact-based interface. The (contactless or contact-based) interface corresponds here to the (contactless or contact-based) interface of the open payment ticket medium to be read. Non-exhaustive examples of contact-based ticket medium interfaces are magnetic stripes and Europay Mastercard VISA chips (EMV chips); examples of preferred contactless ticket medium interfaces are Nearfield Communication interfaces (NFC interfaces) according to ISO 14443 or a Bluetooth interface. Preferably, the reader module of the validator device may be an NFC reader module or may be a Bluetooth interface module.

In particular, an open payment ticket medium according to the application is not coded with a specific transport usage condition respectively a specific ticket product. The electronic medium identifier is in particular an electronically coded medium identifier selected from the group comprising:

- electronic PAN (Primary Account Number) if the Open Payment ticket medium is an (Open Payment) bank card or (Open Payment) credit card (in this case, the storage means may be, in particular, an NFC storage means),
- a UUID (Universally Unique Identifier) if the ticket medium is read via a Bluetooth interface,
- an IMEI (International Mobile Equipment Identity), MAC (Media Access Control) address or other suitable identifier, in particular if the ticket medium is an electronic terminal.

In particular, the electronic medium identifier is a system-wide unique electronic medium identifier. In particular, an electronic medium identifier is always readable electronically (contactless or contact-based).

Preferably, an electronic medium identifier, in particular in the form of an electronically coded PAN (EPAN), means that it is stored in its entirety only in a storage means of the open payment ticket medium and, in particular, cannot be (completely) read by a user optically (or another second storage means of the ticket medium).

Preferably, the open payment ticket medium may be a credit card-based and/or debit card-based ticket medium. Preferably, the open payment ticket medium can be a credit card and/or a debit card. Also, the card-based open payment ticket medium may be a mobile terminal on which a credit card and/or debit card is electronically mapped or to which a credit card and/or debit card is electronically (uniquely) linked. Non-exhaustive examples of such a concept are Apple Pay, Google Pay or PayPal.

The validator device comprises at least one data memory. At least one denial data set is stored in the data memory. It shall be understood that further data (e.g., the at least one predetermined denial criterion, generated denial data sets, etc.) may be stored in the data memory.

The denial data set contains at least one denied electronic medium identifier and at least one denial attribute assigned to the at least one denied electronic medium identifier. A denied electronic medium identifier of the denial data set is stored in the denial data set in particular in the form of a hash value of the denied electronic medium identifier.

In particular, a denial data set may contain a plurality of denied electronic medium identifiers. Preferably, at least one denial attribute can be assigned to each denied electronic medium identifier.

Preferably, the denial data set can be formed in the form of an assignment table. Table 1 shows an exemplary assignment table with n medium identifiers and m attribute values of a denial attribute assigned to each medium identifier. The attribute values can differ from each other or be identical.

TABLE 1

| denied electronic medium identifier | denial attribute |
|---|---|
| medium identifier$_1$ | attribute value$_1$ |
| medium identifier$_2$ | attribute value$_2$ |
| ... | ... |
| medium identifier$_n$ | attribute value$_m$ |

Further, the validator device comprises a verification arrangement. A verification arrangement according to the application comprises at least one comparator module and at least one verification module. The comparator module compares a detected electronic medium identifier with the at least one medium identifier stored in the denial data set as a denied electronic medium identifier. If no correspondence (in particular identity) between a detected electronic medium identifier and a denied electronic medium identifier is detected by the comparator module, the output module may be configured to release the use of the passenger transport system, in particular the at least one transport vehicle. Furthermore, as will be described, a denial data set may be created.

If a correspondence (in particular identity) between a detected electronic medium identifier and a denied electronic medium identifier is detected by the comparator module, an additional check is performed according to the application, in particular of the authorization for using the passenger transport system based on the at least one denial attribute (and its denial attribute value, respectively) and at least one predetermined denial criterion.

The denial criterion specifies in particular when a using of the passenger transport system is permitted even though the associated electronic medium identifier is contained in the denial data set. In particular, the verification module is configured to check whether the denial attribute (and its denial attribute value, respectively) satisfies or does not satisfy the denial criterion. If the verification module determines that the at least one denial attribute satisfies the at least one predetermined denial criterion, the output module is configured to enable and permit, respectively, the use of the passenger transport system, i.e., in particular the at least one transport vehicle.

In particular, the output module is further configured to deny a using of the passenger transport system, that is, in particular, the at least one transport vehicle, if the verification module determines that the at least one denial attribute does not satisfy the at least one predetermined denial criterion.

According to one embodiment of the validator device according to the application, the validator device may further comprise at least one communication module. The communication module may be configured to receive an updated denial data set. The validator device may comprise at least one memory module. The memory module may be configured to store the updated denial data set in the data memory respectively to update the denial data set already stored in the data memory.

The communication module of the validator device may in particular be a remote communication module. The communication module may be connected to at least one (wireless and/or wired) communication network (e.g., a mobile network). An updated denial data set may be provided via the at least one communication network, for example by a background system of the passenger transportation system. Receiving an updated denial data set may occur at regular intervals, at predetermined time points, and/or when there is a change in the denial data set. A change in the denial data set is, for example, an adding or deleting of a denied electronic medium identifier and/or a change in a denial attribute (or its denial attribute value).

On (each) receipt of an updated denial data set, the memory module can update the denial data set stored (locally) in the data memory. Advantageously, the data memory always contains the currently valid denial data set.

According to a further embodiment of the validator device according to the application, the validator device may comprise at least one communication module (described above).

The communication module may (additionally) be configured to send at least one validator data set to a background system of the passenger transport system.

The denial data set may contain at least the detected electronic medium identifier and preferably at least one denial datum selected from the group comprising:
detection time point of the electronic medium identifier,
identifier of the validator device,
position of the validator device during the detection time point of the electronic medium identifier, and
datum whether a use of a passenger transportation system was permitted or denied.

In particular, the validator device may comprise at least one generation module configured to generate a validation data set upon a detecting, by the reader module, of an electronic medium identifier.

The denial data set contains at least the electronic medium identifier. Preferably, the denial data set contains the detection time point (in particular a time stamp) of the electronic medium identifier. Preferably, the denial data set can additionally contain an identifier of the validator device. The identifier can be used in particular to determine the location of the validator device. In particular, this can be used to determine the start point or end point of the trip (or an intermediate stop).

In particular, the validator data set may alternatively or additionally contain a position and position datum, respectively, of the validator device during the detection time point of the electronic medium identifier. The position datum (e.g., GPS coordinates, stop or the like) can at least enable a determination of the position of the validator device at the time point the electronic medium identifier is detected by the validator device. In particular, this makes it possible to determine the trip start point or trip end point (or an intermediate stop) for a validator device that is located within a transport vehicle. Optionally, in particular if the validator device is operated in a transport vehicle, the validator data set may also contain a transport vehicle identifier and/or a trip route identifier.

According to a preferred embodiment of the validator device according to the application, the at least one denial attribute may be a specification of whether or not at least one further transport trip is permitted with the associated open payment ticket medium (respectively the corresponding denied electronic medium identifier). In a simple case, this specification may only indicate that at least one further trip is permitted or not. In this case, the denial criterion may simply indicate that if the specification indicates that at least one additional trip is permitted then a use of the transportation system is allowed. Or if the specification indicates that no further trip is permitted, a use of the transport system is denied. The output module may be configured to permit a use of the passenger transport system if the verification module determines that the specification indicates that at least one further trip is permitted. Otherwise, a further transport trip may be denied.

According to a further embodiment of the validator device according to the application, the at least one denial attribute may be a number of transport trips performed with the associated open payment ticket medium since the electrical medium identifier of the open payment ticket medium was included in the denial data set. The at least one denial criterion may be a maximum allowable number (e.g., the attribute values may be between 0 and 10, preferably between 2 and 8) of transport trips that can be performed.

The output module may be configured to deny a use of the passenger transport system if the verification module determines that the number of transport trips performed with the associated open payment ticket medium is equal to or greater than the maximum allowable number of transport trips that can be performed. The output module may be configured to permit a use of the passenger transport system if the verification module determines that the number of transport trips performed with the associated open payment ticket medium is equal to or less than the maximum allowable number of transport trips that can be performed.

In particular, in the event that the inclusion of an electronic medium identifier in the denial data set was incorrect, this embodiment allows the user to continue using the passenger transport system for the time being and the error that led to the inclusion of the electronic medium identifier in the denial data set can be eliminated in the meantime. Technically, in this embodiment, each transport trip performed since the inclusion of the electronic medium identifier in the denial data set can be counted by a counter (for example, of the background system). The denial data set, in particular the corresponding denial attribute (and its attribute value, respectively), can be changed and updated, respectively, triggered by the counter, each time the number of performed transport trips changes. As soon as the number of performed transport trips has reached or exceeded the maximum allowed number of transport trips, in particular without removing the reason that led to the inclusion of the electronic medium identifier in the denial data set, further transport trips can be denied. Usability can be improved in a simple way without reducing security.

According to an alternative or additional embodiment of the validator device according to the application, the at least one denial attribute may be a time point of the inclusion of the associated denied electronic medium identifier in the denial data set. The at least one denial criterion may be a maximum allowable time duration. The output module may be configured to deny a use of the passenger transportation system if the verification module determines that a time duration since the electronic medium identifier was included in the denial data set is equal to or greater than the maximum allowable time duration. The output module may be configured to permit a use of the passenger transport system if the verification module determines that a time duration since the electronic medium identifier was included in the denial data set is equal to or less than the maximum allowable time duration.

Also in this embodiment, it is of particular advantage that in the event that the inclusion of an electronic medium identifier in the denial data set was incorrect, the user can initially continue to use the passenger transport system and the error that led to the inclusion of the electronic medium identifier in the denial data set can be eliminated in the meantime. Technically, the verification module can be implemented with a timing module in the validator device for this purpose. The timing module of the validator device may be synchronized with a (master) timing module of the background system. In particular, each validator device may have a (slave) timing module. Each of these timing modules may be synchronized with the timing module of the background system. In particular, the background system timing module may specify the (system) time.

When the comparator module has identified a denied electronic medium identifier, the timing module of the validator device can compare the instantaneous time or detection time point of the electronic medium identifier that is considered denied with said time point of the inclusion. The time point of the inclusion may be set as an attribute value by the background system timing module.

If the verification module and the timing module, respectively, of the verification module determines that the determined time difference between the detection time point and the instantaneous time respectively the time point of the inclusion is equal to or greater than the maximum permissible time duration, then a further transport trip can be denied by the output module. Otherwise, a further transport trip may be allowed by the output module. Usability can be improved in a simple way without reducing safety.

According to a particularly preferred embodiment of the validator device according to the application, the at least one denial attribute may be a geographic trip data set that represents and defines, respectively, a master route of the user of the open payment ticket medium of the denied electronic medium identifier.

A master route of a user is in particular to be understood as a (transport) route and a transport path, respectively, which the user (respectively the electronic medium identifier) covers at least with a certain minimum frequency per time unit (e.g., between 2 and 5 times per week and/or between 5 and 20 times per month and/or the like). Optionally, it may be provided that this must be done with a certain regularity (e.g., in 4 out of 5 weeks or in 3 out of 4 months, etc.).

The master route may be defined by at least one trip data set containing at least the trip start point and the trip end point of the master route (and possibly at least one intermediate stop and/or transfer point). For example, a trip start point and/or a trip end point (and/or intermediate stop and/or transfer point) may be defined by geographic coordinates (e.g., GPS coordinates, a stop or identifier of the stop, etc.) and/or an identifier of the respective validator device.

For example, in the case of a validator device that is arranged immovably in a stop area of the passenger transport system, an identifier of the validator device can be used to define a trip starting point and/or a trip end point (and/or intermediate stop and/or transfer point). If the validator device is permanently arranged in a transport vehicle and is thus mobile, a geographic set of coordinates and/or an identifier of the validator device and/or an identifier of the transport vehicle and/or a stop identifier determined by the transport vehicle can be used to define a trip starting point and/or trip end point (and/or intermediate stop and/or transfer point).

The at least one denial criterion can be a location indication respectively position indication of the validator device. The location indication may be an identifier of the validator device, in particular if the validator device is immovably arranged in a stop area of the passenger transport system. Alternatively or additionally, the location indication may be determined by a position determination module (e.g., a GPS module and/or stop and/or the like) of the verification module, if required. If the comparator module has identified a denied electronic medium identifier, the position determination module may determine the instantaneous position respectively location indication of the validator device.

The verification module may be configured to determine whether the location indication is contained in the geographic trip data set. In particular, the verification module may compare the location indication to the geographic trip data set. For example, a location indication in the form of an identifier of the validator device that detected the electronic medium identifier may be compared to the at least one validator device identifier of the geographic trip data set.

Alternatively, a location indication in the form of a detected geographic coordinate data set of the validator device that detected the electronic medium identifier may be compared to the at least one geographic coordinate data set of the geographic trip data set (with a certain tolerance range).

The output module may be configured to deny a use of the passenger transportation system if the verification module determines that the location indication is not contained in the geographic trip data set. The output module may be configured to allow a use of the passenger transportation system if the verification module determines that the location indication is contained in the geographic trip data set. In particular, in this embodiment, usability is further enhanced by allowing the user to continue to use the passenger transportation system on his/her master route, while security is only slightly reduced during, for example, the maximum allowable time period (during which the error that led to the inclusion of the electronic medium identifier in the denial data set can be removed in the meantime), since transportation trips outside the master route are denied.

According to a further embodiment of the validator device according to the application, the at least one denial attribute may be an open amount of money. The at least one denial criterion may be a maximum allowable (open) amount of money, i.e., an amount due for payment from at least one previous transport trip with the associated electronic medium identifier, but which could not previously be credited to the transport service provider. The output module may be configured to deny a use of the passenger transportation system if the verification module determines that the open amount of money is equal to or greater than the maximum allowable amount of money. The output module may be configured to permit a use of the passenger transportation system if the verification module determines that the open amount of money is equal to or less than the maximum allowable amount of money. Security can be further enhanced.

According to a further embodiment of the validator device according to the application, the at least one denial attribute may be a frequent rider indication. In particular, a frequent rider indication may be present if a specific number of transport trips per time unit (e.g., more than 3 transport trips per week, more than 7 transport trips per month and/or the like) is reached or exceeded with the associated electronic medium identifier.

In a simple case, the denial criterion may simply indicate that if a frequent rider indication is present for the denied electronic medium identifier, a use of the transport system is permitted. If a frequent rider specification for the denied electronic medium identifier is not present, a use of the transport system may be denied.

Alternatively or additionally, a frequent rider indication can lead to a further denial criterion being adapted. For example, if a frequent rider indication is present, the maximum permissible number of transport trips can be increased by a specific number (e.g., between 1 and 10, preferably between 2 and 5) and/or the maximum permissible time duration can be increased by an extension time duration (e.g., between 12 h and 10 days, preferably between 2 and 5 days) and/or transport trips outside the master route can also be permitted.

In variants of the application, a denial attribute may be present in particular in the form of a frequent rider indication in a separate frequent rider data set stored in the data memory of the validator device. For example, the background system may send a frequent rider data set to the at least one validator device, preferably to all validator devices of the passenger transportation system. The at least one validator device may store a received frequent rider data set in the data memory. The validation module can access the frequent rider data set when a denied electronic medium identifier has been detected.

As has already been described, a denial data set may be formed in the form of an assignment table. Preferably, each denied electronic medium identifier can be assigned two or more of the denial attributes described above, each with a denial attribute value. A merely exemplary preferred assignment table is shown in FIG. 2 below:

TABLE 2

| EPAN or hash value of the EPAN | Additional rides permitted | In the denial data set since | Number of trips performed since inclusion | Geo-graphical trip data set | Open amount (€) |
|---|---|---|---|---|---|
| 123456789123 | yes | 5.7.22, 14:12:33 | 5 | Data set_1 | 7, 22 |
| 456789123456 | yes | 3.6.22, 22:01:13 | 3 | Data set_2 | 1, 20 |
| 987654321987 | no | 9.7.22, 08:43:56 | n.a. | Not available | 10, 15 |
| ... | ... | ... | ... | ... | ... |

According to a further preferred embodiment of the validator device according to the application, the output module may be configured to deny a use of the passenger transport system by controlling an actuator of a passage barrier such that a denial element of the passage barrier remains in a blocking position or is moved into the blocking position. The output module may be configured to permit a use of the passenger transport system by controlling an actuator of a passage barrier such that a barrier element of the passage barrier remains in a release position or is moved into the release position.

Preferably, a passage barrier may comprise a validator device in accordance with the application, or a validator device in accordance with the application may be assigned to a passage barrier. In particular, a passage barrier is a gate to and/or from a controlled area, i.e., an area that can only be entered with an authorized electronic medium identifier.

A passage barrier comprises, for example, at least one pivoting, retractable and/or telescopic door as a blocking element. The passage barrier can also be formed as a turnstile. In addition, there are passage barriers without structural blocking elements that indicate the permissibility or non-permissibility of passage exclusively optically and/or acoustically.

In the initial state, the passage barrier can usually be blocked. In particular, this means that the blocking element in the blocked position physically prevents a user from passing through the passage barrier. In other cases, the passage barrier may be open in the initial state and close only when a user without a valid access permission attempts to pass through the gate. —Without limiting generality, it is assumed below that the gate is blocked in the initial state and is intended to open upon positive verification of a user's access permission for the user to pass through.

In particular, the output module may control an actuator of the passage barrier for moving the blocking element from the blocked position to the release position and/or vice versa. For example, the output module may be formed in the form of a control module or a control module of the passage barrier may be controlled by the previously described output module and/or comprise the output module. A releasing of a passage barrier, i.e., a permission of a user of the passenger transport system, by an output module comprises in particular a controlling, by the output module, of the actuator of the passage barrier in such a way that the blocking element is moved from the blocked position into the release position. A denial of a use of the passenger transport system, i.e., a refusal of passing the passage barrier by an output module comprises in particular a controlling by the control module of the actuator of the passage barrier in such a way that the blocking element is moved from the release position into the blocked position or remains in the blocked position.

Alternatively, or preferably additionally, the output module may be configured to deny a use of the passenger transport system by controlling at least one optical display of the validator device such that denial information is displayed by the at least one optical display (e.g., screen, light module, etc.). For example, the optical display may display text indicating that an access to the transport vehicle is denied. Alternatively or additionally, the visual display may illuminate in a specific signal color (e.g., red) to indicate denial of an access to the transport vehicle. For example, an access to the transport vehicle in the case of an electronic medium identifier not contained in the denial data set may be indicated by an appropriate text and/or a specific signal color (e.g., green) under control of the output module.

If a detected electronic medium identifier is a denied electronic medium identifier and the at least one denial attribute satisfies the at least one denial criterion, then the output module may be configured to control the at least one optical display such that denial permission information is displayed by the at least one optical display. A denial permission information (for example, a corresponding text and/or a signal color (e.g., orange)) may in particular indicate to the user that his/her electronic medium identifier is considered to be denied, but that a use of the passenger transportation system is still permitted. Usability is further enhanced. An error that led to an inclusion in the denial list can be eliminated as the user is informed that the electronic medium identifier has been denied.

Alternatively or additionally, the output module may be configured to deny a use of the passenger transport system by controlling at least one acoustic interface (e.g., loudspeaker) of the validator device such that denial information is output by the at least one acoustic interface. For example, the acoustic interface may output an announcement indicating that an access to the transport vehicle is denied. Also, the acoustic interface may output a specific beep to indicate a denial of an access to the transport vehicle. For example, an access to the transport vehicle if an electronic medium identifier is not included in the denial data set may be output by an appropriate announcement and/or beep under control of the output module.

If a detected electronic medium identifier is a denied electronic medium identifier and satisfies the at least one denial criterion, then the output module can be configured to control the at least one acoustic interface in such a way that a denial permission information is output by the at least one acoustic interface. A denial permission information (for example, a corresponding announcement and/or a beep) may in particular indicate to the user that his/her electronic medium identifier is considered to be denied, but that a use of the passenger transportation system is still permitted. Usability is further enhanced. An error that led to an inclusion in the denial list can be eliminated because the user is informed that the electronic medium identifier has been denied.

Furthermore, the output module can alternatively or additionally be configured to deny a use of the passenger transportation system by transmitting a radio signal (in particular a Bluetooth signal) containing denial information that can be read by the open-payment ticket medium (e.g., a smartphone or the like) or a (user) terminal of the user. The denial information may contain, for example, an instruction that, when executed by the open-payment ticket medium or the terminal device, causes an audible and/or graphic indication (e.g., text, signal color, announcement, beep, etc.) that access to the transport vehicle is denied. In a corresponding manner, when an electronic medium identifier is not contained in the denial data set, the output module may be configured to permit a use of the passenger transport system by transmitting a radio signal (in particular a Bluetooth signal) containing permission information readable by the open-payment ticket medium or a terminal device of the user. The permission information may contain, for example, an instruction which, when executed by the open-payment ticket medium or the terminal device, causes an acoustic and/or graphic indication (e.g., text, signal color, announcement, signal tone, etc.) that access to the transport vehicle is permitted.

If a detected electronic medium identifier is a denied electronic medium identifier and (but) the at least one denial attribute satisfies the at least one denial criterion, then the output module may be configured to permit a use of the passenger transportation system by transmitting a radio signal (in particular a Bluetooth signal) containing denial permission information readable by the open-payment ticket medium or a terminal device of the user. A denial permission information may contain, for example, an instruction that, when executed by the open-payment ticket medium or terminal device, causes an acoustic and/or graphic indication (e.g., text, signal color, announcement, beep, etc.) that his/her electronic medium identifier is considered denied, but still permits a use of the passenger transportation system. The usability is further improved. An error that led to an inclusion in the denial list can be eliminated as the user is informed about the denial of the electronic medium identifier.

Alternatively or additionally, the output module can be configured to deny a use of the passenger transport system by sending a denial message to a user account associated with the denied electronic medium identifier. The denial message may in particular contain information that an access to the transport vehicle is denied.

Alternatively or additionally, the output module can be configured to send a denial permission message to a user account assigned to the denied electronic medium identifier if a detected electronic medium identifier is a denied electronic medium identifier and the at least one denial criterion is met. In particular, the denial permission message may contain information that an access to the transport vehicle should actually be denied and was only permitted due to the fulfillment of a denial criterion. In particular, the denial permission message may contain information about when or in what way the denial criterion is likely to be no longer satisfied and consequently the concerned medium is effectively denied for a use in the passenger transport system.

A further aspect of the application is a passenger transportation system. The passenger transport system comprises a plurality of previously described validator devices. The passenger transport system comprises at least one background system having at least one communication module. The communication module of the background system is configured to send the denial data set to the plurality of validator devices, in particular to the respective communication module of the respective validator device.

The background system (also referred to as backend system) may be formed by at least one computing device, for example in the form of a server. For example, a plurality of distributed computing devices may be provided. Also, a cloud system may be implemented as the background system.

In particular, the background system may comprise a creation module. The creation module may be configured to create a (previously described) denial data set (e.g., an assignment table).

The created denial data set can be provided to the communication module of the background system. The communication module of the background system can transmit the created denial data set to the plurality of validator devices, in particular to all validator devices of the passenger transport system, via a (previously described) communication network. As has already been described, a received denial data set can be stored by a respective memory module in the respective data memory of the respective validator device.

According to one embodiment of the passenger transport system according to the application, the background system may further comprise at least one trip reconstruction module. The trip reconstruction module may be configured to reconstruct a performed transport trip at least based on a validator data set received from one of the validator devices in the form of a check-in data set containing at least the detected electronic medium identifier.

As has already been described, a denial data set may preferably contain at least one further denial datum. The trip reconstruction is based at least on a check-in data set that defines the start of the transport trip to be reconstructed.

A check-in data set is transmitted to the background system by a validator device. The providing of the check-in data set may comprise transmitting the check-in data set by a validator device.

According to one embodiment of the passenger transport system according to the application, the trip reconstruction module may be configured to reconstruct a performed transport trip additionally based on a provided check-out data set containing at least the same electronic medium identifier as the check-in data set.

Providing a check-out data set may comprise the creating of a validator data set (described above) by the validator device and, in particular, a transmitting the created validator data set to the background system (in the case of a CICO system).

Alternatively or additionally, the providing of a check-out data set can also be performed by the background system (or a further computing device) (in the case of a CIBO system; "check-in/be-out"). For example, sensor data from which the position of the user can be inferred can be provided to the background system. Based on reference position data (for example, of the transport vehicle and/or stop areas), it can then be concluded whether a user has left the transport vehicle and/or a stop area. Then, a corresponding check-out data set can be generated by the background system. A CIBO system can be used in particular if the ticket media used not only have an electronic medium identifier that can be read by a validator device during check-in, but also have their own sensor technology (e.g., GPS, position and/or vibration sensor, compass, etc.) and can establish a data connection with the background system so that the electronic media can send at least sensor data or presence data in a transport vehicle to the background system. From this, associated with a check-in process, a subsequent be-out state can be constructed, i.e., a leaving (or having left) the transport vehicle without a check-out by the user. For a CIBO system, mobile devices such as smartphones are in particular used.

Furthermore, the background system may comprise at least one generation module. The generation module can be configured to generate a billing data set at least based on the reconstructed transport trip and in particular the electronic medium identifier. It shall be understood that further data, such as tariff data, etc., may be taken into account in variants of the application.

The communication module of the background system may be configured to send a payment request including the billing data set to a computing device (e.g., a server) of a payment service provider (e.g., a bank). In particular, the payment service provider may depend on the electronic medium identifier.

According to a further preferred embodiment of the passenger transport system according to the application, the communication module of the background system may be configured to receive a payment response to the sent payment request. The background system may comprise at least one creation module (described above). The creation module may be configured to create a (updated) denial data set at least based on the received payment response.

Particularly preferably, the payment response may comprise payment denial information and at least one payment denial reason. The creation module may be configured to create an (updated) denial data set based on the payment denial information, the at least one payment denial reason and at least one predefined denial generation criterion.

In particular, a corresponding electronic medium identifier may be included in the denial data set upon receipt of payment denial information by the creation module. The creation module may be configured to assign the at least one denial attribute (with at least one denial attribute value) with that electronic medium identifier based on the at least one payment denial reason.

A payment denial reason may be, for example, that the open payment ticket medium of the electronic medium identifier has been denied (for example, due to theft and/or loss of the ticket medium), that the validity date of the open payment ticket medium of the electronic medium identifier has expired, that the card limit of the open payment ticket medium of the electronic medium identifier has been reached, or that a velocity check of the payment service provider (e.g., a bank) has led to a rejection, in particular due to too frequent use of the open payment ticket medium within a certain period of time. It shall be understood that further payment denial reasons can be specified.

For example, if the validity expires or if the ticket medium is denied, the specification whether at least one further transport trip with the associated open payment ticket medium is permitted or not can be set, by the creation module, to the negative. Furthermore, in the case of a velocity check or when the ticket limit is reached, for example, the specification whether at least one further transport trip with the associated open payment ticket medium is permitted or not can be set, by the creation module, to the positive. The at least one denial generation criterion defines in particular the relationship between a denial attribute (respectively its value) and a payment denial reason.

In addition, the creation module can preferably set further denial attributes (and its denial attribute values, respectively), such as the number of transport trips performed (e.g., 0) since inclusion in the denial data set, the time of inclusion, etc. This can be additionally defined by the at least one block generation criterion.

Alternatively or additionally, the creation module can be configured to create the denial data set based on the payment history of the electronic medium identifier (to be denied) in the passenger transport system. If, for example, the creation module determines that, in the case of an electronic medium identifier, payment for the performed transport trips has (almost) always been made (i.e., there is a positive payment history), the specification as to whether or not at least one further transport with the associated open payment ticket medium is permitted can be affirmatively given by the creation module. If, for example, the creation module determines that the payment of the performed transport trips was (almost) always problematic in the case of an electronic medium identifier (i.e., there is a negative payment history), the specification of whether at least one further transport trip with the associated open payment ticket medium is permitted or not can be negated by the creation module.

According to a further embodiment of the passenger transport system according to the application, the creation module can be configured to create an (updated) denial data set based on a transport trip performed with a denied electronic medium identifier. In particular, the creation module may comprise a counter that counts the number of performed transport trips made with the associated ticket medium since the electronic medium identifier was included in the denial data set. According to the counter, the denial data set can then be updated, in particular whenever the counter reading changes. In the example of Table 2, in particular the number of trips performed since inclusion can be increased.

According to a particularly preferred embodiment of the passenger transportation system according to the application, the background system may further comprise at least one determination module. The determination module may be configured to determine the geographic trip data set representing the master route of the user of the open payment ticket medium of the user of the corresponding electronic medium identifier based on a plurality of received validator data sets each containing at least the same electronic medium identifier and an identifier of the validator device and/or a position of the validator device during the detection time point of the electronic medium identifier. The creation module may be configured to create a (updated) denial data set based on the determined geographic trip data set.

In particular, each validator data set and/or each reconstructed transport trip can be stored by the background system. The determination module can evaluate the stored (historical) validator data sets and/or the reconstructed transport trips, in particular evaluate them regularly.

If, during evaluation, the determination module can determine that for the same electronic medium identifier, the same route (preferably defined by trip start point (e.g., a particular validator device identifier and/or particular set of coordinates) and trip end point (e.g., a specific validator device identifier and/or specific set of coordinates)) has been traveled with a specific minimum frequency per unit of time (e.g., between 2 and 5 times per week and/or between 5 and 20 times per month and/or the like), a corresponding geographic trip data set can be determined and, in particular, stored, for example, in a master route database. If an electronic medium identifier is then to be included in the denial data set, the creation module may be configured to search the master route database for a master route for that electronic medium identifier. If it is determined that a master route exists for the medium identifier to be denied, the corresponding geographic trip data set may be included in the denial data set as a denial attribute (value) by the creation module.

Alternatively or additionally, the at least one validator device may comprise a determination module. The determination module may be configured to determine a geographic trip data set representing the master route of the user of the open payment ticket medium of the corresponding electronic medium identifier based on a plurality of validator data sets created by the validator device each containing at least the same electronic medium identifier. The validator device may comprise at least one update module. The update module may be configured to update the denial data set with the determined geographic trip data set when the electronic medium identifier of the trip data set is contained in the denial data set.

In particular, each validator data set generated by the validator device can be stored by this validator device. The determination module of the validator device can evaluate the stored (historical) validator data sets, in particular evaluate them on a regular basis.

If the determination module of the validator device can determine during evaluation that validator data sets have been generated for the same electronic medium identifier with a certain minimum frequency per unit of time (e.g., between 2 and 5 times per week and/or between 5 and 20 times per month and/or the like), a corresponding geographic trip data set can be determined and, in particular, stored, for example, in a master route database.

For example, the master route database may be implemented in the background system. Then, if an electronic medium identifier is to be included in the denial data set, the creation module and/or the update module may be configured to search the master route database for a master route for that electronic medium identifier. If it is determined that a master route exists for that medium identifier, the corresponding geographic trip data set may be included in the denial data set as a denial attribute (value) by the creation module and/or the update module.

Further, the communication module of the validator device may be configured to send a denial data set updated by the update module to the background system. The creation module may then create an updated denial data set based on the received updated denial data set and, for example, cause a distribution to all of the validator devices.

According to a further embodiment of the passenger transport system according to the application, the communication module of the background system can be configured to repeatedly transmit payment requests for a (preferably each) denied electronic medium identifier contained in the (current) denial data set, in particular independently of a detection of the denied electronic medium identifier by a validator device. In this way, it can be determined in particular in a timely manner whether an open amount can be settled in the meantime.

Alternatively or additionally, according to a further embodiment of the passenger transport system according to the application, the communication module of the background system can be configured to set up a "Request for Information" on the part of the payment service provider for a denied electronic medium identifier; in this case, the payment service provider informs the background system as soon as the denied electronic medium identifier has been permitted again. This avoids the need to send out repeated (possibly costly) payment requests. This also makes it possible to determine in particular in a timely manner whether an open amount can be settled in the meantime.

The creation module can be configured to create a (updated) denial data set based on the respective payment responses received. If a payment response results in a change, the denial data set for the corresponding denied electronic medium identifier can be adjusted respectively updated.

If, for example, the open amount has been paid in the meantime, the corresponding electronic medium identifier can be removed from the denial data set. However, if, for example, the creation module initially answered in the affirmative whether or not at least one further transport trip with the associated open payment ticket medium is permitted, based on a velocity check response, and now a further (subsequent) payment response contains a denial of the open payment ticket medium respectively the corresponding electronic medium identifier as a payment denial reason, the creation module can (now) negate the specification that whether or not at least one further transport trip with the associated open payment ticket medium is permitted.

According to a further embodiment of the passenger transport system, the at least one denial criterion may be changeable. In particular, the background system may make a change and then distribute the at least one changed denial criterion to the plurality of validator devices.

A further aspect of the application is a method, in particular executable by a previously described validator device (of a previously described passenger transport system). The method comprises:

detecting, by a reader module of a validator device of a passenger transportation system, an electronic medium identifier of an open payment ticket medium, wherein a denial data set is stored in a data memory of the validator device, wherein the denial data set contains at least one denied electronic medium identifier and at least one denial attribute assigned to the denied electronic medium identifier, identifying, by a comparator module of the validator device, a denied electronic medium identifier from the at least one denied electronic medium identifier contained in the denial data set by comparing the detected electronic medium identifier with the at least one denied electronic medium identifier, upon identifying a denied electronic medium identifier, checking, by a verification module of the validator device, whether the at least one denial attribute assigned to the identified denied electronic medium identifier satisfies at least one predetermined denial criterion, and permitting, by an output module of the validator device, a use of the passenger transport system if the verification module determines that the at least one denial attribute satisfies the at least one predetermined denial criterion.

A module or device can be formed at least partially from software and/or at least partially from hardware. In particular, a device/module may comprise suitable computing elements (e.g., processor, memory, etc.) to execute software elements (or computer code). It should also be noted that terms such as "first"; "second" etc. do not indicate an order, but serve in particular to distinguish between two elements.

The features of the validator devices, passenger transport systems and methods can be freely combined with each other. In particular, features of the description and/or the dependent claims can be independently inventive, even by completely or partially circumventing features of the independent claims, in sole position or freely combined with each other.

BRIEF DESCRIPTION OF THE DRAWINGS

There are now a large number of possibilities for designing and further developing the validator device according to the application, the passenger transport system according to the application and the method according to the application. In this regard, reference is made on the one hand to the claims subordinate to the independent claims, and on the other hand to the description of embodiment examples in connection with the drawings. The drawings show:

Similar elements are designated below with similar reference signs.

DETAILED DESCRIPTION OF SPECIFIC EMBODIMENTS

Figure 1:
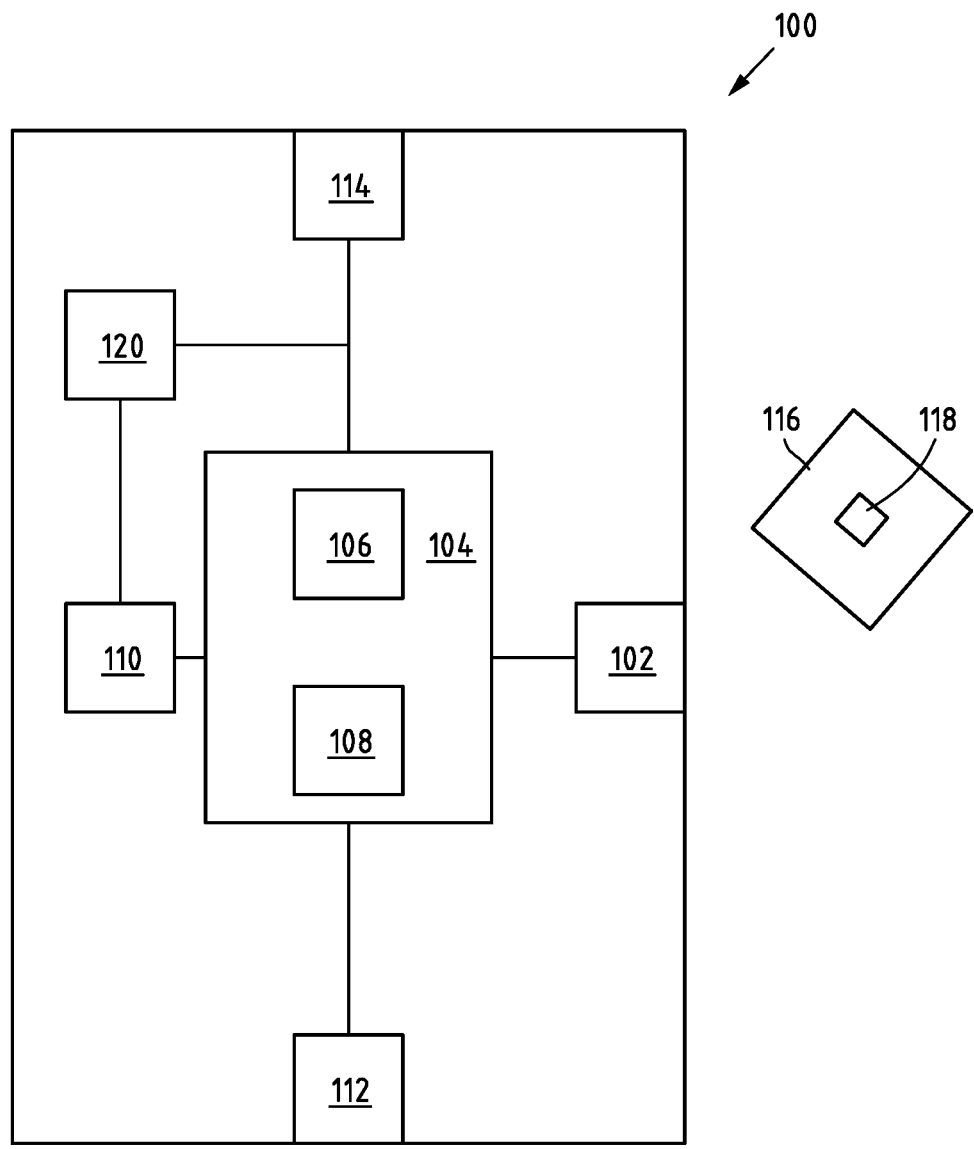
FIG. 1 a schematic view of an embodiment of a validator device according to the present application, FIG. 2 a schematic view of an embodiment of a passage barrier according to the present application with an embodiment of a validator device according to the present application, FIG. 3 a schematic view of an embodiment of a passenger transport system according to the present application, and FIG. 4 a diagram of an embodiment of a method according to the present application.

FIG. 1 shows a schematic view of an embodiment of a validator device 100 according to the present application. The validator device 100 is used in a passenger transport system (cf. FIG. 3).

The validator device 100 comprises at least one reader module 102, preferably an NFC reader module 102. In variants of the application, a validator device may comprise at least one reader module based on another technology (e.g., Bluetooth, etc.) and/or at least one further reader module. The reader module 102 is configured to (technically) detect and read, respectively, an electronic medium identifier of an open payment ticket medium 116.

An open payment ticket medium 116 according to the present application may comprise at least one storage means 118. The storage means 118 serves to store the electronic medium identifier of the ticket medium 116. The electronic medium identifier can be read in particular via a (contactless and/or contact-based) interface of the open payment ticket medium 116 that is not shown.

Preferably, the open payment ticket medium 116 may be a credit card-based and/or debit card-based ticket medium 116. Preferably, the open payment ticket medium 116 may be a credit card and/or a debit card. Also, the card-based open payment ticket medium 116 may be a mobile terminal on which a credit card and/or debit card is electronically mapped or to which a credit card and/or debit card is electronically (uniquely) linked. Non-exhaustive examples of such a concept are Apple Pay, Google Pay or PayPal.

Exemplary and non-exhaustive mobile devices here comprise smartphones, tablet computers, mobile game consoles, laptops, netbooks, data glasses, smartwatches, and similar wearables.

A denial data set is stored in a data memory 110 of the validator device 100. The denial data set contains at least one denied electronic medium identifier and at least one denial attribute assigned to the denied electronic medium identifier. For example, the denial data set may be formed according to Table 1 and/or Table 2.

Optionally, the validator device 100 may comprise at least one (remote) communication module 114 that may be configured to receive a denial data set. In particular, updated denial data sets may be received from a background system via the communication module 114.

When an updated respectively new denial data set is received, an optional memory module 120 may store that denial data set in the data memory 110 as a then valid denial data set.

Further, the illustrated validator device 100 comprises a verification arrangement 104 having at least one comparator module 106 and at least one verification module 108. A detected electronic medium identifier may be provided by the reader module 102 of the verification arrangement 104.

The comparator module 106 is configured to identify a denied electronic medium identifier from the at least one denied electronic medium identifier contained in the denial data set by comparing the detected electronic medium identifier with the at least one denied electronic medium identifier. In particular, the comparator module 106 (immediately) accesses the data memory 110 upon receiving a detected electronic medium identifier and compares that electronic medium identifier with the stored denied electronic medium identifiers to determine whether or not the detected electronic medium identifier is identical to a denied electronic medium identifier.

In particular, the verification module 108 according to the application is only used if the comparator module 106 has identified a denied electronic medium identifier, i.e., the detected electronic medium identifier is contained in the denial data set. The verification module 108 is configured, upon identifying a denied electronic medium identifier, to check whether the at least one denial attribute associated with the identified denied electronic medium identifier satisfies at least one predetermined denial criterion.

The at least one denial criterion may, for example, specify that the specification of whether or not at least one further transport trip with the associated open payment ticket medium is permitted must be affirmative, the number of transport trips performed since inclusion in the denial data set must be less than 7, and the duration of time since inclusion in the denial data set must be less than 1 month. Further, for example, a timing module (not shown) of the verification module 108 may determine 08/01/2022, 14:51 as the detection time point of the electronic medium identifier by the reader module. In the example shown in Table 2, only the denial attributes (respectively attribute values thereof) from the first electronic medium identifier (123456789123) satisfy the above criteria. As has been described, fewer or more or other denial attributes and/or denial criteria may be checked by the verification module. As has been described, other and/or further criteria (with e.g., other attribute values) may be provided.

In addition, the validator device 100 comprises at least one output module 112. In particular, the result of the checking of a detected electronic medium identifier by the verification arrangement 104 may be provided to the output module 112. The output module 112 may be configured to deny a use of the passenger transportation system if the verification module 108 determines that the at least one denial attribute (preferably all denial attributes) does not satisfy the at least one predetermined denial criterion (preferably all denial criteria). In the previous example, if the detected electronic medium identifier corresponds to the second electronic medium identifier (456789123456) of the denial data set shown in Table 2, then the verification module determines that at least one denial attribute from that identifier does not satisfy at least one corresponding denial criterion.

The output module 112 is further configured to permit a use of the passenger transportation system when the verification module 108 determines that the at least one denial attribute satisfies the at least one predetermined denial criterion (as in the described example of the first electronic medium identifier (123456789123)).

Further, the output module 112 may be configured to permit a use of the passenger transportation system when the comparator module 106 determines that the detected electronic medium identifier is not contained in the denial data set.

Figure 2:
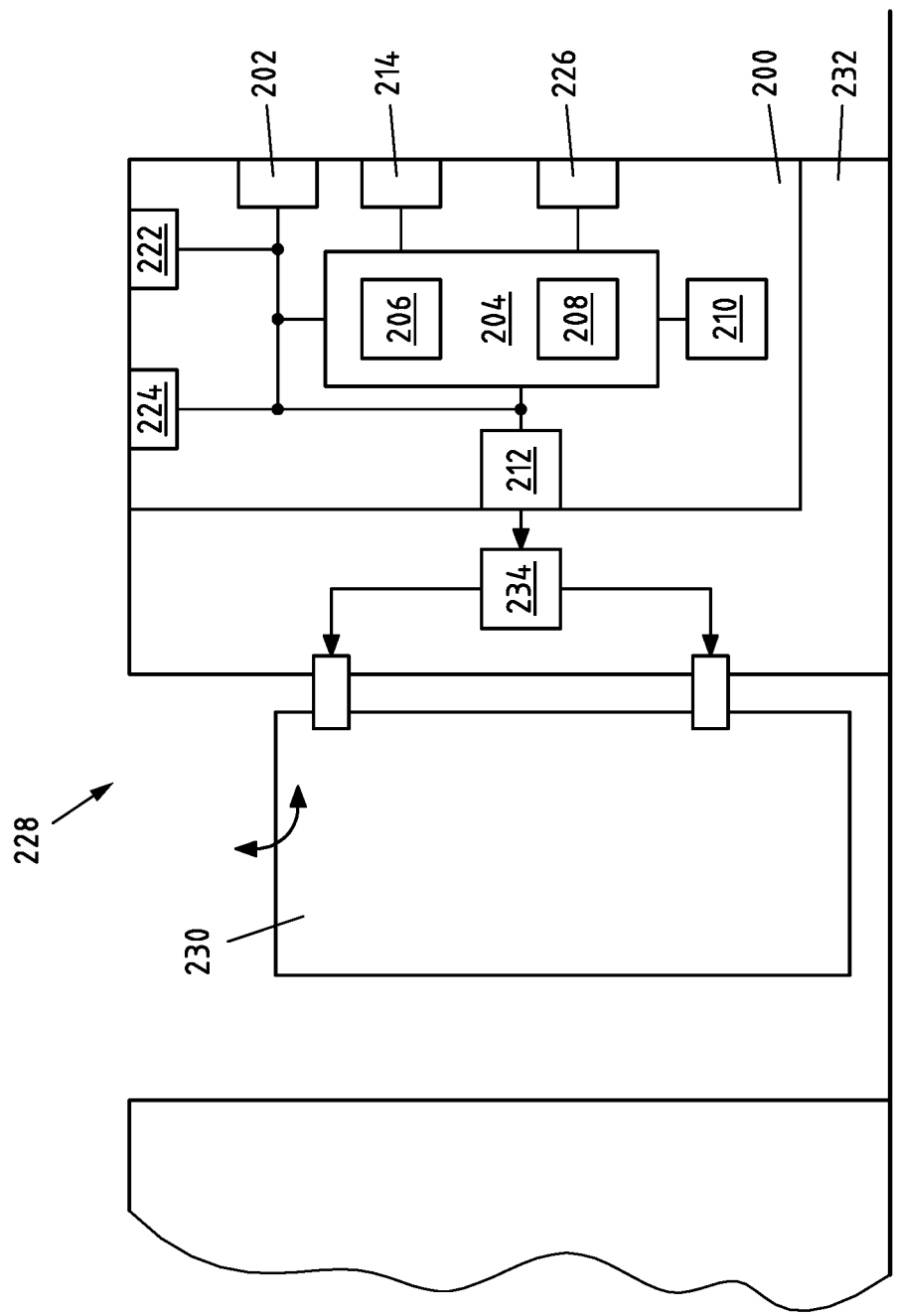

FIG. 2 shows a schematic view of an embodiment of a passage barrier 228 according to the present application with an embodiment of a validator device 200 according to the present application. In order to avoid repetitions, in the following essentially only the differences to the embodiment example according to FIG. 1 are described with respect to the validator device 200 and otherwise reference is made to the previous explanations.

The illustrated passage barrier 228 is formed by a base body 232 and a blocking element 230 (e.g., a pivotable door) arranged movably at the base body 232. At least one controllable actuator 234 is integrated in the base body 232. The actuator 234 is configured to move the at least one blocking element 230 between a (shown) blocking position respectively closed position and a release position respectively open position.

In the initial state, the illustrated passage barrier 228 may be blocked. In particular, this means that in the blocked position, the blocking element 230 physically prevents a user from passing through the passage barrier 228. In the release position, the blocking element may be moved such that a user is not physically prevented from passing through the passage barrier 228.

Furthermore, a validator device 200 is integrated in the base body. The depicted validator device 200 comprises, by way of example, at least one optical display 222 (for example, a light source that can light up in different colors), an acoustic interface 224 (for example, a loudspeaker) and a radio module 226 (for example, a Bluetooth module).

In the present embodiment, the output module 212 may be configured to control the actuator 234. For example, the output module 212 may be integrated in and/or form a controller of the passage barrier 228.

If the comparator module 206 determines that the detected electronic medium identifier is not contained in the denial data set (and that the detected electronic medium identifier is from an issuer that is authorized in the passenger transport system), the output module 212 may permit the passenger transport system to be used by controlling at least the actuator 234 such that the blocking element 230 is moved to the release position at a first speed.

When the verification module 208 determines that the at least one denial attribute satisfies the at least one predetermined denial criterion (as in the described example of the first electronic medium identifier (123456789123)), the output module 212 may permit the passenger transport system to be used by controlling at least the actuator 234 such that the blocking element 230 is moved to the release position.

Optionally, the output module 212 can thereby control the actuator 234 in such a way that the blocking element 230 is moved into the release position at a second speed, wherein the second speed can preferably be smaller than the first speed. In other words, it may be provided that a passage barrier opens recognizably slower if a ticket medium is used that is contained in a denial list and that is (still) permitted only because it fulfills a denial criterion.

Optionally, the output module 212 may control the optical display 222 and/or the acoustic interface 224 and/or the radio module 226. For example, controlling may cause permission information and/or denial permission information to be displayed by the at least one optical display and/or to be output by the acoustic interface and/or to be transmitted by the radio module. In particular, a slow opening (compared to a normal mode) of the blocking element 230 may (briefly) retain the user and cause the user to perceive the optical display 222 and read its displayed information. If the open payment ticket medium is, for example, a smartphone or the like, an emitted permission information respectively a denial permission information may be received by that terminal. Instructions contained therein may be executed by the terminal such that a corresponding information is displayed by an optical display of the terminal and/or is displayed by a haptic interface of the terminal and/or is output by an acoustic interface of the terminal.

Alternatively or additionally, the output module 212 may be configured to cause a denial permission message to be sent to a user account associated with the denied electronic medium identifier.

If the verification module 208 determines that the at least one denial attribute does not satisfy the at least one predetermined denial criterion, the output module 212 may be configured to deny a use of the passenger transport system by actuating an actuator 234 such that the blocking element 230 remains in the blocking position (in other variations, a moving to the blocking position may be caused). An access to the transport vehicle is physically prevented.

Optionally, the output module 212 may be configured to deny a use of the passenger transportation system by controlling at least one optical display 222 such that a denial information is displayed by the at least one optical display 222 and/or by controlling at least one acoustic interface 224 such that a denial information is output by the at least one acoustic interface 224 and/or by controlling the radio module such that a transmitting of a radio signal (in particular a Bluetooth signal) is caused containing a denial information readable by the open payment ticket medium or a terminal device.

Alternatively or additionally, the output module 212 may be configured to deny a use of the passenger transportation system by controlling the communication module 214 to cause a sending of a denial message to a user account associated with the denied electronic medium identifier.

It shall be understood that in variants of the application, no controllable actuator can also be provided in a validator device and, for example, only at least one optical display and/or at least one acoustic interface and/or at least one radio module can be controlled by the output module.

Figure 3:
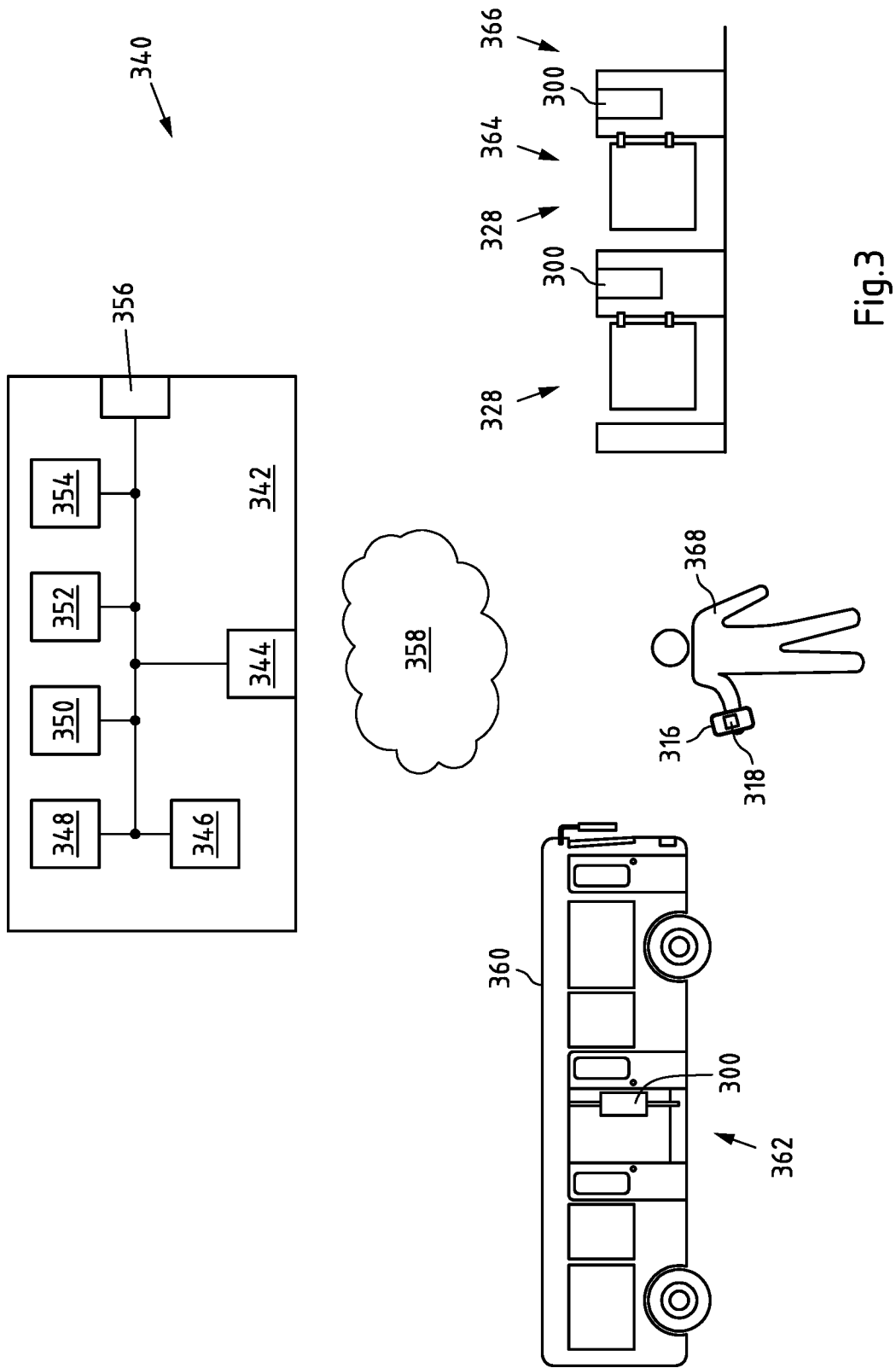

FIG. 3 shows an embodiment of a passenger transport system 340 according to the present application. The passenger transport system 340 comprises a plurality of validator devices 300. As an example, three validator devices 300 are shown in the illustrated embodiment. Merely for the sake of a better overview, details of the depicted validator devices 300 have been omitted. A validator device 300 can, for example, be formed in accordance with a validator device according to FIG. 1 and/or FIG. 2 so that reference is made to these embodiments in particular with regard to the details of a validator device.

A validator device 300 can be arranged in a transport vehicle 360 (in the present example a bus), in particular in an entrance area 362 and/or an exit area 362 of the transport vehicle 360. An arrangement in the entrance area 362 and/or exit area 362 of the transport vehicle 360 enables a user of the passenger transport system 340 to hold (in a simple manner) his/her open payment ticket medium 316 within the range of the reader module of the validator device 300 when entering or leaving in order to cause the electronic medium identifier of the open payment ticket medium 316 to be detected.

For example, as has been described, at least one optical display and/or at least one acoustic interface may indicate whether a use of the passenger transport system 340 respectively the transport vehicle 360 is permitted or denied after an electronic medium identifier is detected.

Preferably, the passenger transport system 340 may comprise the at least one transport vehicle 360.

Alternatively or additionally, a validator device 300 may be disposed in a stop area 364 of the passenger transportation system 340. For example, a gate array 366 having a plurality of passage barriers 328 may be provided. Merely for the sake of clarity, details of a passage barrier 328 have been omitted. For example, a passage barrier 328 can be formed in accordance with the passage barrier according to FIG. 2, so that reference is made to FIG. 2 in particular with regard to the details.

The passenger transport system 340 may comprise the at least one passage barrier 328, in particular the at least one gate array 366.

In addition, the passenger transportation system 340 may comprise at least one open payment ticket medium 316, preferably a plurality of open payment ticket media 316.

Furthermore, the passenger transport system 340 comprises at least one background system 342. The illustrated background system 342 (in particular formed by at least one computing device and/or a cloud system) comprises at least one communication module 344. The communication module 344 of the background system 342 is at least configured to exchange data with the validator devices 300 via at least one (wireless and/or wired) communication network 358. The at least one communication module 344 is configured to send respectively distribute a denial data set to the plurality of validator devices 300.

Further, the communication module 344 may be configured to receive validator data sets. As has been described, a validator device 300 is configured to detect electronic medium identifiers. In particular, a validator device 300 may comprise at least one generation module (not shown) that may be configured to generate a validator data set. In particular, a respective validator data set may be generated for each detected electronic medium identifier.

A validator data set contains at least the electronic medium identifier and preferably the time point of detection (in particular a time stamp) of the detection of the electronic medium identifier by the reader module and an identifier of the validator device 300. By means of the identifier of the validator device 300, in particular the location of the validator device 300 can be determined (for example, using a (not shown) location database in which a location indication is assigned to each identifier). In particular, this can be used to determine the trip start point or trip end point (or an intermediate stop) of the user 368.

Further, the validator data set may alternatively or additionally comprise a position respectively position datum of the validator device 300 during the time point of detection of the electronic medium identifier. This is in particular the case when the validator device 300 is located in a transport vehicle 360. The position datum (e.g., GPS coordinates or stop or the like) may at least allow a determining of the position of the validator device 300 at the time point the electronic medium identifier is detected by the validator device 300. This may determine the trip start point or trip end point (or an intermediate stop) of a validator device 300 located within a transport vehicle 360.

Optionally, a validator data set may contain a datum indicating whether a use of the passenger transportation system 340 has been permitted or denied for the corresponding electronic medium identifier. Also, a validator data set may contain at least one further identifier, such as a vehicle identifier.

A generated validator data set may be transmitted to the background system 342 by the communication module of the validator device 300, for example immediately after the validator data set is generated. It may also be provided that generated validator data sets are initially stored locally, and stored validator data sets are transmitted as a bundle from time to time (for example, periodically, or when a communication link to the background system can be established, or when a certain number of validator data sets have been generated, or the like).

The background system 342 may preferably comprise a trip reconstruction module 346 configured to reconstruct a performed transport trip at least based on a received (previously described) validator data set in the form of a check-in data set and optionally a provided check-out data set containing at least the same electronic medium identifier. Other data, such as schedule data, transport vehicle movement data 360, etc., may be considered by the trip reconstruction module 346 for reconstructing the performed transport trip.

Based on a reconstructed transport trip, a generation module 348 of the background system 342 may be configured to generate a billing data set (in a conventional manner). The communication module 344 (which may be formed of several different communication means based on different technologies) of the background system 342 may be configured to send a payment request containing the billing data set to a (not shown) computing device of a payment service provider (e.g., a bank or the like).

The communication module 344 may further be configured to receive a payment response to a sent payment request. A payment request and/or a payment response preferably includes/contains the electronic medium identifier (for example, in the form of a hash value).

Furthermore, a payment response may contain payment denial information and at least one payment denial reason. It shall be understood that further data may be contained.

In addition, the background system 342 preferably comprises a creation module 350. The shown creation module 350 is configured to create a denial data set. In particular, the creation module 350 may be configured to create a denial data set based on the payment denial information, the at least one payment denial reason, and at least one predetermined denial generation criterion. The denial generation criterion may be stored in a data memory 352 of the background system 342 and may in particular specify the rules according to which a denial attribute (and its value, respectively) is created.

The creation module 350 may, for example, create and, in particular, update an assignment table corresponding to Table 1 and/or 2, for example upon detection of a change. For example, the creation module 350 can comprise at least one counter (not shown) that is configured to count the transport trips performed with this electronic medium identifier since the electronic medium identifier was included in the denial data set based on the received validator data sets and/or the reconstructed transport trips with the same electronic medium identifier.

Preferably, in addition, the creation module 350 may comprise a timing module (not shown). The timing module may be configured to determine the time point of inclusion of an electronic medium identifier in the denial data set. Further, the timing module may be a master timing module (variants may include an additional master timing module) configured to synchronize the timing modules of the validator devices 300.

In addition, the background system 342 may comprise at least one determination module 354 configured to determine the geographic trip data set representing respectively defining the master route of the user of the open payment ticket medium 316 of the user of the corresponding electronic medium identifier based on a plurality of received validator data sets each containing at least the same electronic medium identifier and an identifier of the validator device 300 and/or the position of the validator device 300 during the time point of detection of the electronic medium identifier.

The determination module 354 may evaluate the (historical) validator data sets stored in the data memory 352, for example, or the reconstructed transport trips based thereon. If, during the evaluation, the determination module 354 determines that, for the same electronic medium identifier, the same route respectively transport trip (preferably defined by trip start point (e.g., a determined validator device identifier and/or determined set of coordinates) and trip end point (e.g. a determined validator device identifier and/or determined set of coordinates)) has been traveled with a specific minimum frequency per unit of time (e.g., between 2 and 5 times per week and/or between 5 and 20 times per month and/or the like), a corresponding geographic trip data set may be determined and stored, in particular, in, for example, a master route database 356.

The creation module 350 may access this master route database 356. In particular, when an electronic medium identifier is to be included in the denial data set, the creation module 350 may search the master route database 356 for the electronic medium identifier to be included. If it is determined that a geographic trip data set exists for that medium identifier, a denial attribute may be assigned to that medium identifier with the determined trip data set as the denial attribute value. As has been described, a validator device may alternatively or additionally have a determination module.

Figure 4:
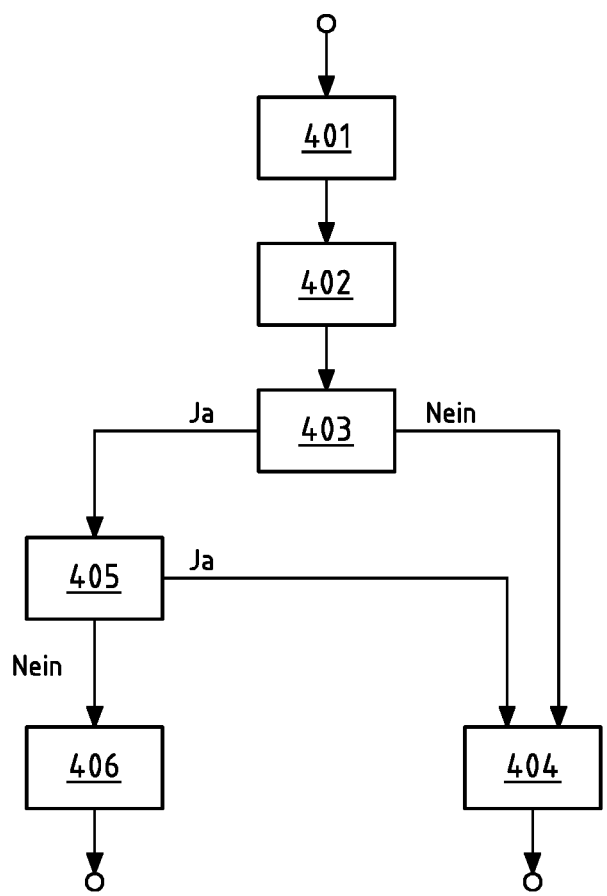

FIG. 4 shows a diagram of an embodiment of a method according to the present application. In particular, the method can be carried out by a validator device according to FIG. 1 and/or FIG. 2, for example in a passenger transport system according to FIG. 3.

In step 401, a receiving may be performed of a (updated) denial data set by a communication module of a validator device. The received (updated) denial data set may be stored by a memory module in the data memory of the validator device. As has been described, the denial data set contains at least one denied electronic medium identifier and at least one denial attribute assigned to the denied electronic medium identifier.

In step 402, a detecting is performed of an electronic medium identifier of an open payment ticket medium by a reader module of the validator device, as described.

In step 403, an identifying is performed, by a comparator module of the validator device, of a denied electronic medium identifier from the at least one denied electronic medium identifier contained in the denial data set by comparing the detected electronic medium identifier with the at least one denied electronic medium identifier, as has been described.

If no denied electronic medium identifier can be identified, i.e., the detected electronic medium identifier is not contained in the denial data set, then, by the output module, a use of the passenger transportation system may be permitted respectively enabled in step 404, as has been described.

If a denied electronic medium identifier is identified, i.e., if the detected electronic medium identifier is contained in the denial data set, a check is performed in step 405 by a verification module of the validator device to determine whether the at least one denial attribute assigned to the identified denied electronic medium identifier satisfies at least one predetermined denial criterion, as has been described.

If it can be determined that the at least one denial attribute associated with the identified denied electronic medium identifier satisfies the at least one predetermined denial criterion, then, by the output module, a permitting is performed of a use of the passenger transport system in step 404, as has been described.

Further, in step 406, a denying may be performed, by the validator device output module, of a use of the passenger transport system if the verification module determines that the at least one denial attribute does not satisfy the at least one predetermined denial criterion, as has been described.

LIST OF REFERENCE SIGNS 100 validator device
102 reader module
104 verification arrangement
106 comparator module
108 verification module
110 data memory
112 output module
114 communication module of the validator device
116 open payment ticket medium
118 storage means
120 memory module
200 validator device
202 reader module
204 verification arrangement
206 comparator module
208 verification module
212 output module
214 communication module of the validator device
222 optical display
224 acoustic interface
226 radio module
228 passage barrier
230 blocking element
232 base body
234 actuator
300 validator device
316 open payment ticket medium
328 passage barrier
340 passenger transport system
342 background system
344 communication module of the background system
346 trip reconstruction module 348 generation module
350 creation module
352 data memory
354 determination module
356 master route database
358 communication network
360 transport vehicle
362 exit area respectively entrance area
364 stop area
366 gate array
368 user

What is claimed is:

1. A validation method, comprising:
   detecting, by a validator device of a passenger transportation system, an electronic medium identifier of an open payment ticket medium,
   wherein a denial data set is stored in a data memory of the validator device,
   wherein the denial data set contains at least one denied electronic medium identifier and at least one denial attribute assigned to the denied electronic medium identifier,
   identifying, by the validator device, a denied electronic medium identifier from the at least one denied electronic medium identifier contained in the denial data set by comparing the detected electronic medium identifier to the at least one denied electronic medium identifier,
   upon identifying a denied electronic medium identifier, checking, by the validator device, whether the at least one denial attribute assigned to the identified denied electronic medium identifier satisfies at least one predetermined denial criterion, and
   permitting, by an output of the validator device, a use of the passenger transport system if the validator device determines that the at least one denial attribute satisfies the at least one predetermined denial criterion.

2. The validation method according to claim 1, further comprising:
   receiving an updated denial data set, and
   storing the updated denial data set in the data memory.

3. The validation method according to claim 1, further comprising:
   sending at least one validator data set to a background system of the passenger transport system,
   wherein the validator data set contains at least the detected electronic medium identifier and preferably at least one validation datum selected from the group comprising:
   detection time point of the electronic medium identifier,
   identifier of the validator device,
   position of the validator device during the detection time point of the electronic medium identifier.

4. The validation method according to claim 1, wherein the at least one denial attribute is a specification whether at least one further transport trip with the associated open payment ticket medium is permitted or not.

5. The validation method according to claim 1, wherein the at least one denial attribute is a number of transport trips performed with the associated open payment ticket medium since the electronic medium identifier of the open payment ticket medium was included in the denial data set, and
   that at least one denial criterion is a maximum allowable number of performable transport trips.

6. The validation method according to claim 1, wherein the at least one denial attribute is a time point of inclusion of the associated denied electronic medium identifier in the denial data set, and
   that at least one denial criterion is a maximum permissible time duration, and
   permitting a use of the passenger transportation system if the verification module determines that a time duration since the electronic medium identifier was included in the denial data set is equal to or less than the maximum permissible time duration.

7. The validation method according to claim 1, wherein the at least one denial attribute is a geographic trip data set defining a master route of the user of the open payment ticket medium of the denied electronic medium identifier, and
   the at least one denial criterion is a location indication of the validator device,
   determining whether the location indication is included in the geographic trip data set, and
   permitting a use of the passenger transportation system if the validator device determines that the location indication is included in the geographic trip data set.

8. The validation method according to claim 1, wherein
   denying a use of the passenger transport system by controlling an actuator of a passage barrier such that a barrier element of the passage barrier remains in a blocking position or is moved to the blocking position, or
   denying a use of the passenger transport system by controlling at least one optical display of the validator device such that a denial information is displayed by the at least one optical display; or
   denying a use of the passenger transport system by controlling at least one acoustic interface of the validator device such that a denial information is output by the at least one acoustic interface, or
   denying a use of the passenger transport system by transmitting a radio signal containing denial information readable by the open payment ticket medium or a terminal, or
   denying a use of the passenger transportation system by sending a deny message to a user account associated with the denied electronic medium identifier.

9. A validator device that performs according to claim 1.

10. Passenger transport system, comprising:
    a plurality of validator devices each configured to perform the method according to claim 1, and
    at least one background system configured to send the denial data set to the plurality of validator devices.

11. Passenger transportation system of claim 10, wherein the background system is further configured:
    to reconstruct a performed transport trip at least based on a validator data set in the form of a check-in data set received from one of the validator devices, containing at least the detected electronic medium identifier, and
    to generate a billing data set based at least on the reconstructed transportation trip, and
    to send a payment request containing the billing data set to a computing device of a payment service provider.

12. Passenger transportation system according to claim 11, wherein the background system
    is further configured to reconstruct the performed transport trip additionally based on a provided check-out data set containing at least the same electronic medium identifier as the check-in data set.

13. Passenger transport system according to claim 10, wherein
- the background system is further configured to receive a payment response to the sent payment request, and
- to create a denial data set based at least on the received payment response.

14. Passenger transport system according to claim 13, wherein
- the payment response contains a payment denial information and at least one payment denial reason, and
- the background system is configured to create a denial data set based on the payment denial information, the at least one payment denial reason, and at least one predetermined denial generation criterion.

15. Passenger transport system according to claim 13, wherein
- the background system is configured to create a denial data set based on a transport trip performed with a denied electronic medium identifier.

16. Passenger transportation system according to claim 10, wherein the background system is further configured:
- to determine the geographic trip data set representing the master route of the user of the open payment ticket medium of the user of the corresponding electronic medium identifier based on a plurality of received validator data sets each including at least the same electronic medium identifier and an identifier of the validator device and/or the position of the validator device during the detection time point of the electronic medium identifier, and
- to create a denial data set based on the determined geographic trip data set.

* * * * *